US010600388B1

(12) United States Patent
Pais et al.

(10) Patent No.: US 10,600,388 B1
(45) Date of Patent: Mar. 24, 2020

(54) MANAGING DISPLAY BRIGHTNESS OF A MOBILE DEVICE

(71) Applicant: MOTOROLA MOBILITY LLC, Chicago, IL (US)

(72) Inventors: Martin R. Pais, North Barrington, IL (US); John C. Pincenti, Chicago, IL (US); Ying Zhang, Shanghai (CN); Lan Li, Shanghai (CN)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/289,624

(22) Filed: Feb. 28, 2019

(51) Int. Cl.
*G09G 5/10* (2006.01)
*H04M 1/725* (2006.01)
*G01K 1/14* (2006.01)

(52) U.S. Cl.
CPC .............. *G09G 5/10* (2013.01); *G01K 1/14* (2013.01); *H04M 1/72569* (2013.01); *G09G 2320/0646* (2013.01); *G09G 2320/103* (2013.01); *G09G 2330/045* (2013.01); *G09G 2340/0407* (2013.01); *G09G 2340/0435* (2013.01); *G09G 2360/144* (2013.01); *G09G 2360/145* (2013.01); *G09G 2360/16* (2013.01)

(58) Field of Classification Search
None
See application file for complete search history.

(56) References Cited

U.S. PATENT DOCUMENTS

| 2009/0327777 | A1* | 12/2009 | Vasquez | G09G 3/3611 |
| | | | | 713/320 |
| 2012/0229494 | A1* | 9/2012 | Kobayashi | G09G 5/397 |
| | | | | 345/589 |
| 2013/0091348 | A1* | 4/2013 | Kwon | G06F 1/206 |
| | | | | 713/100 |
| 2013/0120630 | A1* | 5/2013 | Kim | H04N 5/23241 |
| | | | | 348/333.01 |
| 2016/0179150 | A1* | 6/2016 | Liu | G05D 23/1917 |
| | | | | 700/300 |

* cited by examiner

*Primary Examiner* — Frank S Chen
(74) *Attorney, Agent, or Firm* — Yudell Isidore PLLC

(57) ABSTRACT

A method, a mobile device, and a computer program product for managing display brightness of a mobile device. The method includes detecting a first temperature value of a mobile device and determining, by a processor, if the first temperature value is greater than a threshold temperature value. In response to determining that the first temperature value is greater than the threshold temperature value, video data is retrieved for several video frames. The method further includes determining if the video data contains a transition from a first video frame to a second video frame that includes a change in light level that is greater than a light level threshold. In response to determining that the video data contains the change in light level, the display is triggered to reduce a first light level associated with the second video frame to a second light level when the second video frame is displayed.

20 Claims, 6 Drawing Sheets

MANAGING DISPLAY BRIGHTNESS OF A MOBILE DEVICE

BACKGROUND

1. Technical Field

The present disclosure generally relates to electronic devices and in particular to managing the display brightness of a mobile device.

2. Description of the Related Art

Mobile electronic devices, such as cell phones, generate heat during operation. The amount of heat generated by mobile device components increases as the components perform at a higher rate. For example, the display of a mobile device generates more heat as the brightness of the display increases. If the increased brightness of the display causes the mobile device to be excessively hot, a user may find the high temperature of the mobile device uncomfortable. Unfortunately, a quick reduction in the brightness of the display to reduce device temperature can result in luminosity changes that induce a jerky and uncomfortable visual experience to the viewer of the mobile device display.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
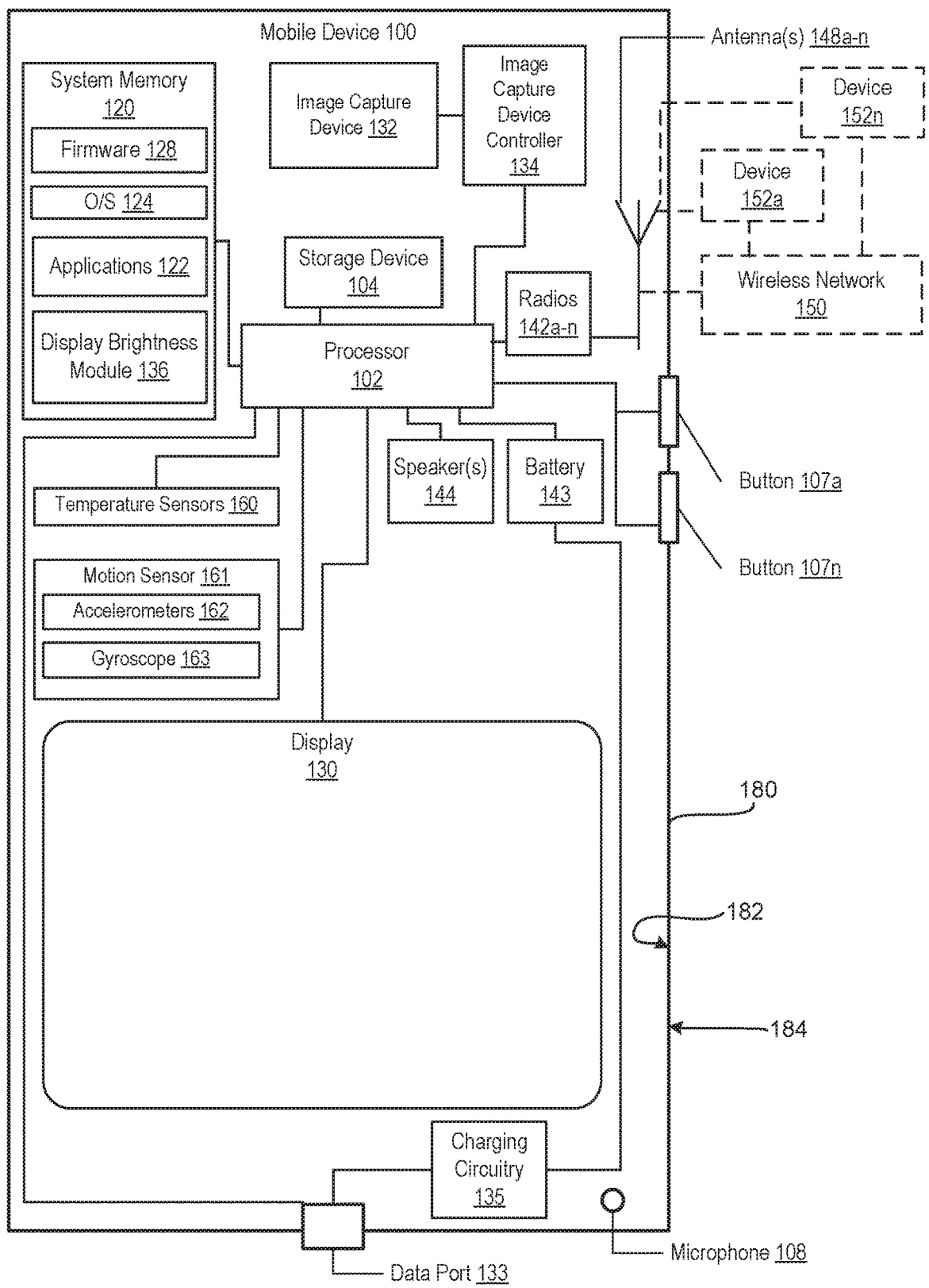
FIG. 1 depicts an example mobile device within which various aspects of the disclosure can be implemented, according to one or more embodiments.

The illustrative embodiments provide a method, a mobile device, and a computer program product for managing display brightness of a mobile device. The method includes detecting, via a temperature sensor, a first temperature value of a mobile device and determining, by a processor, if the first temperature value is greater than a threshold temperature value. In response to determining that the first temperature value is greater than the threshold temperature value, video data is retrieved for several video frames. The method further includes determining if the video data contains a transition from a first video frame to a second video frame, where the transition includes a change in light level that is greater than a first light level threshold. In response to determining that the video data contains the change in light level that is greater than the first light level threshold, the method includes triggering the display to reduce a first light level associated with the second video frame to a second light level when the second video frame is displayed.

According to another embodiment, a mobile device comprises a memory having stored thereon a display brightness module for determining a brightness of the display screen of the mobile device. The mobile device further includes at least one temperature sensor that detects a first temperature value associated with the mobile device. The mobile device further includes a display and one or more processors communicatively coupled to the memory, the display screen, and the at least one temperature sensor. The one or more processors execute the program code of the display brightness module. The program code enables the mobile device to receive the first temperature value from the at least one temperature sensor and to determine if the first temperature value is greater than a threshold temperature value. The program code further enables the mobile device to, in response to determining that the first temperature value is greater than the threshold temperature value, retrieve video data for several video frames. The program code further enables the mobile device to determine if the video data contains a transition from a first video frame to a second video frame, where the transition includes a change in light level that is greater than a first light level threshold. The program code further enables the mobile device to, in response to determining that the video data contains the change in light level that is greater than the first light level threshold, trigger the display screen to reduce a first light level associated with the second video frame to a second light level when the second video frame is displayed.

According to an additional embodiment, a computer program product includes a computer readable storage device with program code stored thereon which, when executed by one or more processors of a mobile device having at least one temperature sensor, a display, and a memory, enables the mobile device to complete the functionality of receiving a first temperature value from the at least one temperature sensor and determining if the first temperature value is greater than a threshold temperature value. The computer program product further enables the mobile device to, in response to determining that the first temperature value is greater than the threshold temperature value, retrieve video data for a plurality of video frames. The computer program product further enables the mobile device to determine if the video data contains a transition from a first video frame to a second video frame, where the transition includes a change in light level that is greater than a first light level threshold. The computer program product further enables the mobile device to, in response to determining that the video data contains the change in light level that is greater than the first light level threshold, trigger the display to reduce a first light level associated with the second video frame to a second light level when the second video frame is displayed.

The above contains simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the figures and the remaining detailed written description. The above as well as additional objectives, features, and advantages of the present disclosure will become apparent in the following detailed description.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within mobile device 100 are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

FIG. 1 depicts an example mobile device 100 within which various aspects of the disclosure can be implemented, according to one or more embodiments. Examples of such mobile devices include, but are not limited to, a notebook computer, a mobile phone, a digital camera, and a tablet computer, etc. Mobile device 100 includes processor 102, which is communicatively coupled to storage device 104, system memory 120, display 130, and image capture device controller 134. Mobile device 100 is contained within a housing 180 that has an interior surface 182 and an exterior surface 184.

System memory 120 may be a combination of volatile and non-volatile memory, such as random access memory (RAM) and read-only memory (ROM). System memory 120 can store program code or similar data associated with firmware 128, an operating system 124, applications 122, and display brightness module 136. Display brightness module 136 includes program code that is executed by processor 102. Although depicted as being separate from applications 122, display brightness module 136 may also be implemented as an application. Processor 102 loads and executes program code stored in system memory 120. Examples of program code that may be loaded and executed by processor 102 include program code associated with applications 122 and program code associated with display brightness module 136. Display 130 can be one of a wide variety of display screens or devices, such as a liquid crystal display (LCD) and an organic light emitting diode (OLED) display.

In one embodiment, image capture device 132 is communicatively coupled to image capture device controller 134, which is communicatively coupled to processor 102. Image capture device 132 can capture images that are within the field of view of image capture device 132. Image capture device 132 can also sense the ambient light level of the environment surrounding mobile device 100.

Mobile device 100 can further include data port 133, charging circuitry 135, and battery 143. In some embodiments, display 130 can be a touch screen device that can receive user tactile/touch input. Mobile device 100 further includes a microphone 108, one or more speakers 144, and one or more input buttons 107a-n. Input buttons 107a-n may provide controls for volume, power, and image capture device 132. Mobile device 100 further includes radios 142a-n, which are coupled to antennas 148a-n. In this implementation, radios 142a-n and antennas 148a-n allow mobile device 100 to communicate wirelessly with other devices 152a-n via wireless network 150.

Mobile device 100 further includes temperature sensors 160 and motion sensor(s) 161. Motion sensor(s) 161 can include one or more accelerometers 162 and gyroscope 163. Temperature sensors 160 can be located at several locations within mobile device 100. For example, one temperature sensor can be located adjacent processor 102, one temperature sensor can be located adjacent display 130 and one or more temperature sensors can be located adjacent to interior surfaces 182 of mobile device 100. In at least one embodiment, temperature sensors 160 can be used to estimate the exterior surface temperatures of exterior surface 184 at one or more locations on mobile device 100.

Motion sensor(s) 161 can detect movement of mobile device 100 and provide motion data to processor 102 that indicate the spatial orientation and movement of mobile device 100. Accelerometers 162 measure linear acceleration of movement of mobile device 100 in multiple axes (X, Y and Z). For example, accelerometers 162 can include three accelerometers, where one accelerometer measures linear acceleration along the X axis, one accelerometer measures linear acceleration along the Y axis, and one accelerometer measures linear acceleration along the Z axis. Gyroscope 163 measures rotation or angular rotational velocity of mobile device 100.

Figure 2:
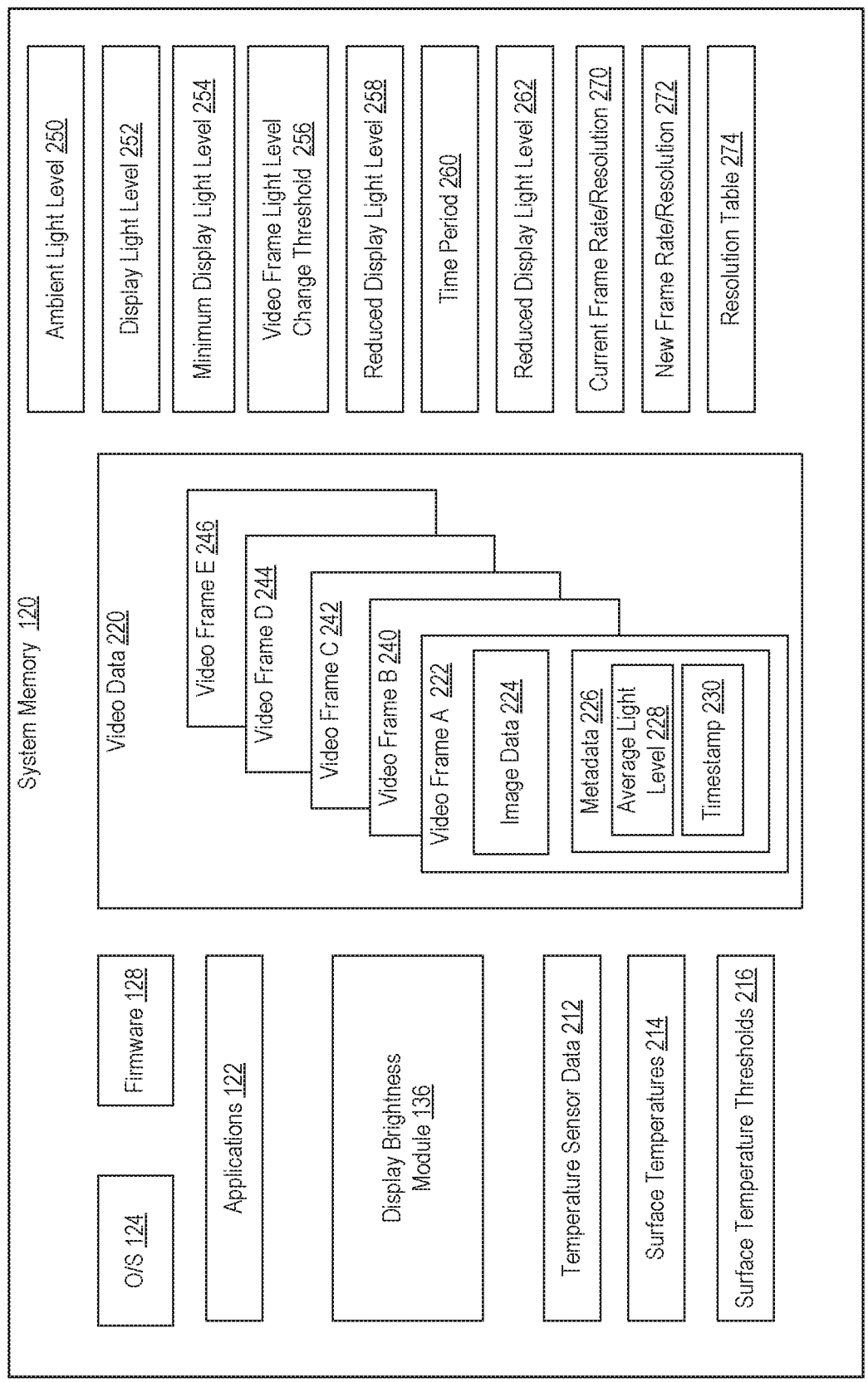
FIG. 2 is a block diagram of example contents of the system memory of a mobile device, according to one or more embodiments.

In the description of each of the following figures, reference is also made to specific components illustrated within the preceding figure(s). With reference now to FIG. 2, one embodiment of example contents of system memory 120 of mobile device 100 is shown. System memory 120 includes data, software, and/or firmware modules, including firmware 128, operating system 124, applications 122, and display brightness module 136. Display brightness module 136 enables management of the brightness of display 130 and can reduce the brightness of display 130 if the temperatures sensed by temperature sensors 160 exceed a pre-determined level. In one embodiment, execution of display brightness module 136 by processor enables/configures mobile device to perform the processes presented in the flowcharts of FIGS. 4A-C, as will be described below.

System memory 120 further includes temperature sensor data 212, estimated surface temperatures 214, and threshold temperatures 216. Temperature sensor data 212 is received from temperature sensors 160. Estimated surface temperatures 214 are estimated surface temperature values for several locations on exterior surface 184. Estimated surface temperatures 214 are calculated by processor 102 and are based on temperature sensor data 212. Threshold temperatures 216 are pre-determined maximum surface temperatures tolerated for mobile device 100.

System memory 120 further includes video data 220. Video data 220 contains data for one or more individual video frames that are to be shown on display 130. Video data 220 can be stored in a video buffer for frames that are to be shown on display 130. Video data 220 can originate from a wide variety of sources. Video data 220 can be associated with a movie, video streaming, gaming, or other sources.

Example video data 220 includes video frame A 222, video frame B 240, video frame C 242, video frame D 244 and video frame E 246. Video frame A 222 includes image data 224 and meta-data 226. In one embodiment, image data 224 can be YUV data. YUV is a color encoding system typically used as part of a color image pipeline. YUV encodes a color image or video, taking human perception into account, allowing for reduced bandwidth of the video data. YUV data defines a color space in terms of one brightness or luma (Y) component and two color or chrominance (UV) components for the pixels that make up an image.

Meta-data 226 includes data pertaining to or about video frame A 222. In one embodiment, meta-data 226 includes an average luminance or light level 228 and timestamp 230. Average light level 228 is the average of the luma values for all of the pixels in video frame A and corresponds to the luminance of display 130 when video frame A is shown. Timestamp 230 is the time associated with when video frame A is to be shown. Similarly, within video data 220, each of the other video frames (i.e., video frames 240-246) also contains image data and meta-data for their respective video frame.

System memory 120 also includes ambient light level 250, current display light level 252 and minimum display light level 254. Ambient light level 250 is the current light level of the environment surrounding mobile device 100, as sensed by image capture device 132. Ambient light level 250 is measured by image capture device 132. In one embodiment, image capture device 132 can be oriented to face a user and measure the brightness of the users face instead of the ambient light level that is behind and/or to either side of the mobile device.

Current display light level 252 is the current light level emitted by display 130. Minimum display light level 254 is calculated based on the ambient light level 250 and current display light level 252. Minimum display light level 254 is the minimum light level that display 130 can be operated at without making the display non-viewable to a user. In other words, the display has to have a minimum level of luminance above the ambient light level in order to be visible to a user. When the ambient light level is very bright, the display cannot be dimmed very much or the display will be non-viewable by the user.

System memory 120 further includes video frame light level threshold 256 and reduced display light level 258. Video frame light level threshold 256 is a pre-determined value of a threshold change in light level between video frames. The change in light level between video frames can be associated with an increase in light level or a decrease in light level. Reduced display light level 258 is a lower light level value for display 130 that is calculated for one or more video frames based on the temperature sensor data 212 and video data 220.

System memory 120 additionally includes time period 260 and reduced display light level 262. Time period 260 is a time interval during which the display light level is gradually reduced such that the reduction in light intensity is less noticeable. Reduced display light level 262 is a lower light level value (i.e., reduced from current light level 252) for display 130 that is calculated for the video frames of time period 260 based on the temperature sensor data 212 and video data 220.

System memory 120 also includes current frame rate and resolution 270, new frame rate and resolution 272, and resolution table 274. Frame rate is the frequency at which consecutive images called frames (i.e., video frames 222 and 240-246) appear on display 130. Frame rate has units of frames per second. Resolution is the number of distinct pixels that are shown on display 130. Resolution is the number of pixels in width and length of the display. In one embodiment, the resolution can be 720 pixels in width and 1280 pixels in length. Current frame rate and resolution 270 are the current values of frame rate and resolution used in the operation of display 130. Current frame rate and resolution 270 are typically pre-determined.

New frame rate and resolution 272 are the values of frame rate and resolution that are used in the operation of display 130 when power is to be reduced to display 130 and the display cannot be dimmed because the light level difference between ambient light level 250 and average light level 228 is insufficient for viewing. New frame rate and resolution 272 are calculated based on the current frame rate and resolution 270, temperature sensor data 212, video data 220 and resolution table 274. The new frame rate and resolution 272 enables a desired reduction in the operating temperature of mobile device 100. In one embodiment, the frame rate can be changed first. If the change in frame rate is insufficient to lower the temperature of the mobile device, then the resolution can be changed based on resolution table 274. Resolution table 274 contains several lower resolution values that can be selected from for use with display 130.

Figure 3:
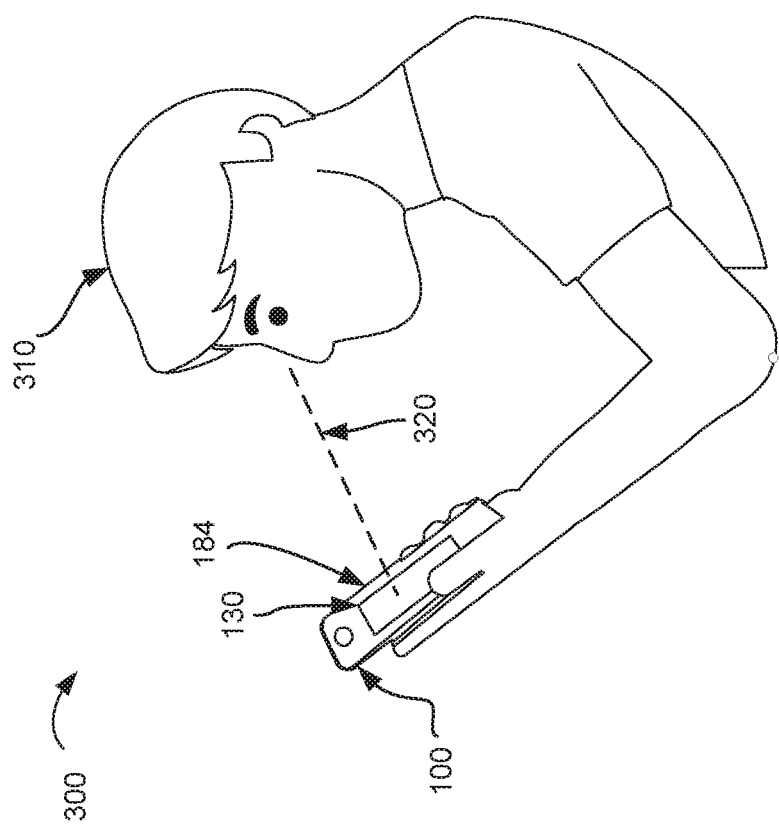
FIG. 3 is an example illustration of a mobile device having a display being viewed by a user, according to one or more embodiments.

FIG. 3 illustrates an example of mobile device 100 being viewed by a user 310. User 310 is holding the outer surface 184 of mobile device 100 and is viewing display 130. Light is emitted from display 130 and travels along an optical path 320 to the eye of user 310.

Light level or luminance is a photometric measure of the luminous intensity per unit area of light travelling in a given direction. It describes the amount of light that passes through, is emitted or reflected from a particular area, and falls within a given solid angle. The standard unit for luminance is candela per square meter. Luminance is often used to characterize emission or reflection from flat, diffuse surfaces. The luminance indicates how much luminous power will be detected by an eye looking at the surface from a particular angle of view. Luminance is thus an indicator of how bright the surface will appear. In this case, the angle of interest is the angle subtended by the eye of the user. Brightness is an attribute of visual perception in which a source appears to be emitting or reflecting light. In other words, brightness is the perception elicited by the luminance or light level of a visual target.

There is a minimum required change in light level needed to produce a change in eye sensation. The brightness response of the human eye is not proportional to light's nominal (physical) intensity, but is proportional to its intensity level. The response of the human eye to light is not linear. Eye response is not determined by the nominal change in light energy, but rather by change relative to the initial light level. This can be referred to as Weber's Law or the "just noticeable difference". The "just noticeable difference" is the minimum amount by which the nominal light intensity must be changed in order to produce a noticeable variation in sensory experience to a human viewer.

Weber's Law states that the size of the just noticeable difference (i.e., delta I) is a constant proportion of the original stimulus value. For example, two spots of light each have an intensity of 100 units to an observer. The intensity of one of the spots is increased until one spot was just noticeably brighter than the other. If the brightness needed to yield the just noticeable difference was 110 units, then the observer's difference threshold would be 10 units (i.e., delta I=110−100=10). Using Weber's Law, one could now predict the size of the observer's difference threshold for a light spot of any other intensity value. If, the Weber fraction for discriminating changes in stimulus brightness is a constant proportion equal to 0.1, then the size of the just noticeable difference for a spot having an intensity of 1000 would be 100 (i.e., delta I=0.1×1000=100). When the brightness or light level of a display is high, larger changes in light level can be made that are not noticeable to a viewer than when the display is at a low brightness or light level.

In an embodiment, processor 102, executing display brightness module 136 can detect, via temperature sensor 160, a first temperature value of mobile device 100. Processor 102 determines if the first temperature value is greater than a threshold temperature value (i.e., surface temperature thresholds 216). In response to determining that the first temperature value is greater than the threshold temperature value, processor 102 retrieves video data 220 for several video frames (i.e., video frames 222 and 240-246). Processor 102 determines if the video data 220 contains a transition from a first video frame to a second video frame. The transition including a change in light level that is greater than a first light level threshold (i.e., video frame light level change threshold 256). In response to determining that the video data 220 contains the change in light level that is greater than the first light level threshold, processor 102 triggers display 130 to reduce a first light level associated with the second video frame to a second light level when the second video frame is displayed.

Figure 4A:
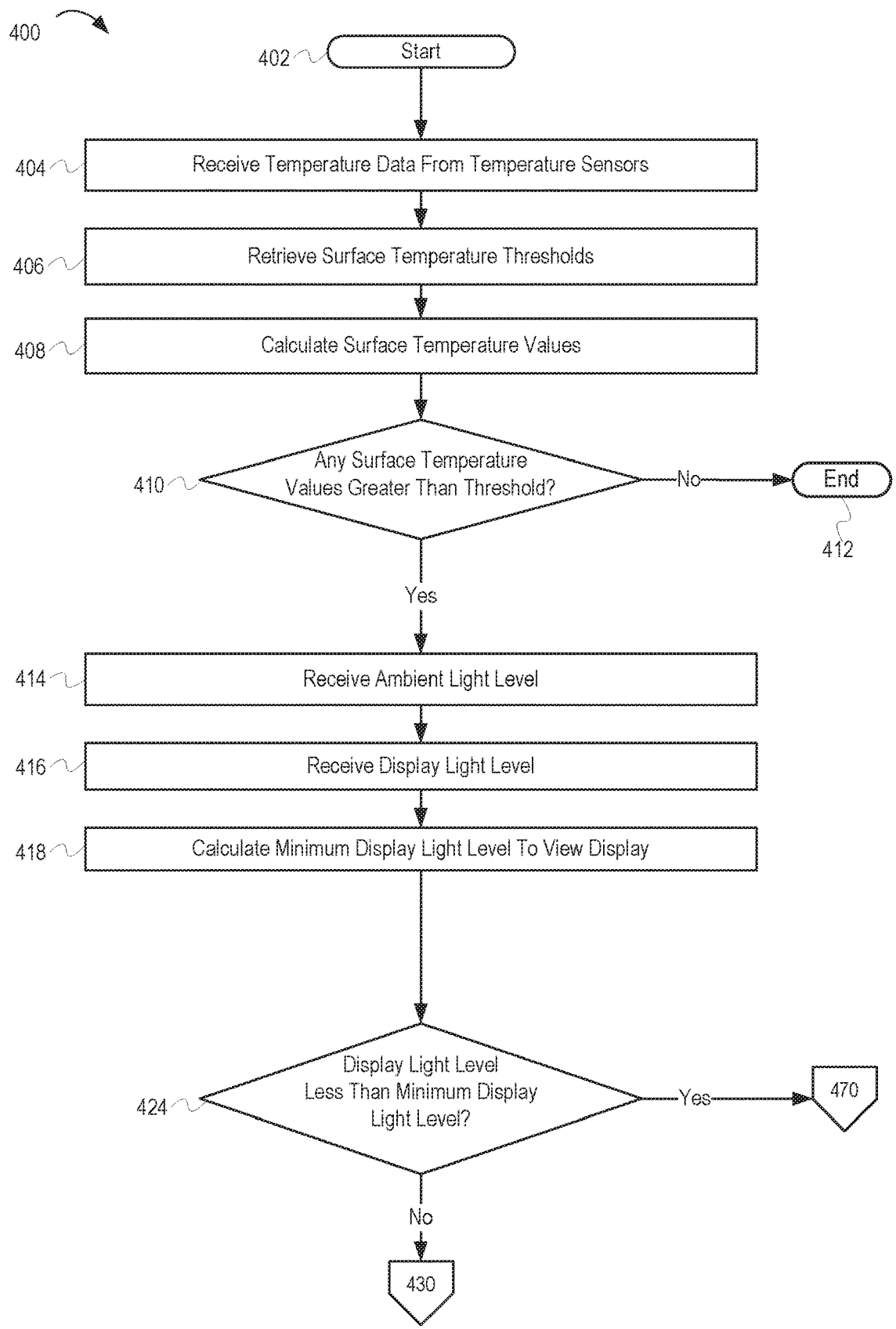
FIGS. 4A-C depict a method of managing display brightness of a mobile device, according to one or more embodiments.
Figure 4B:
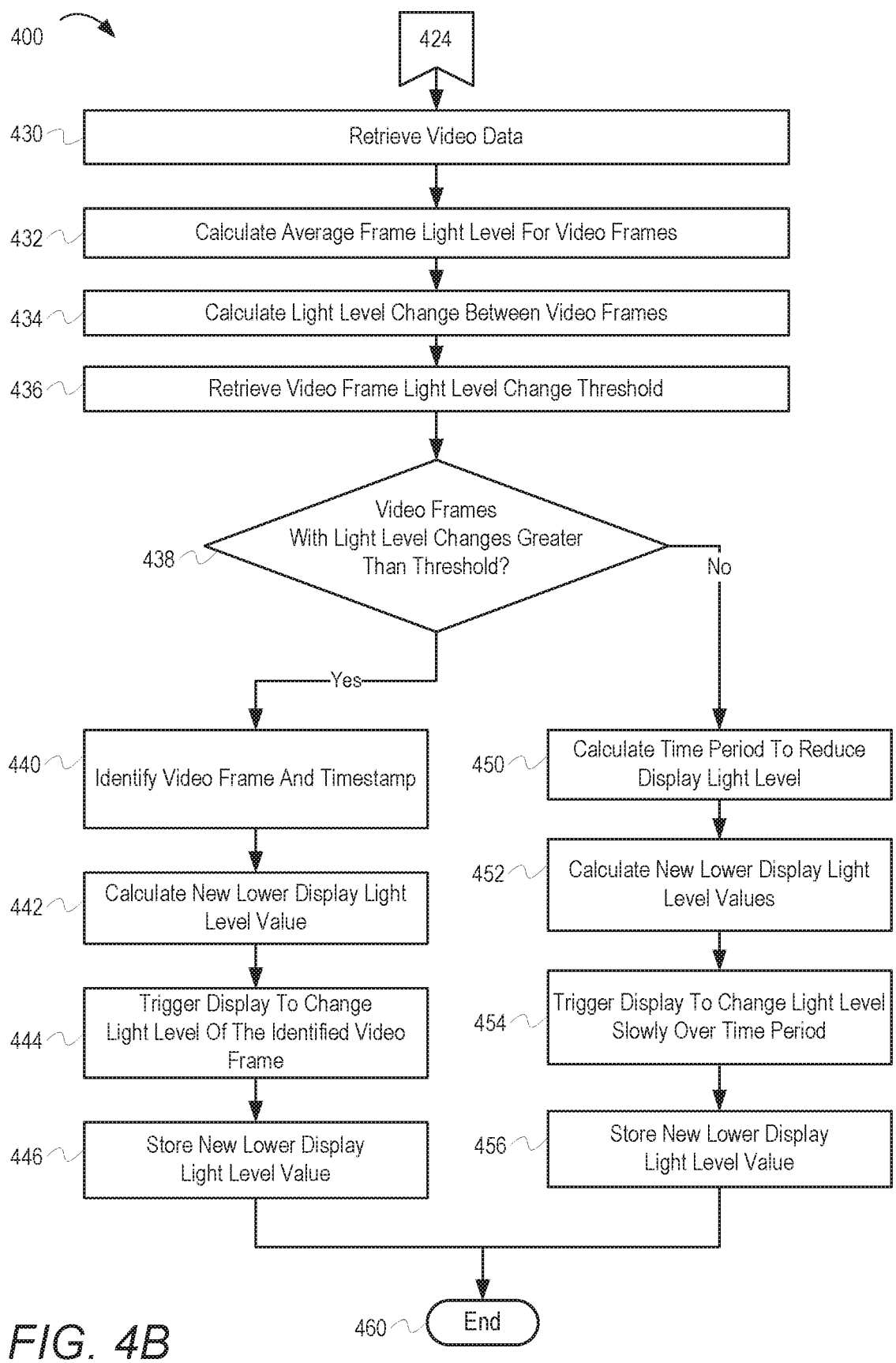
Figure 4C:
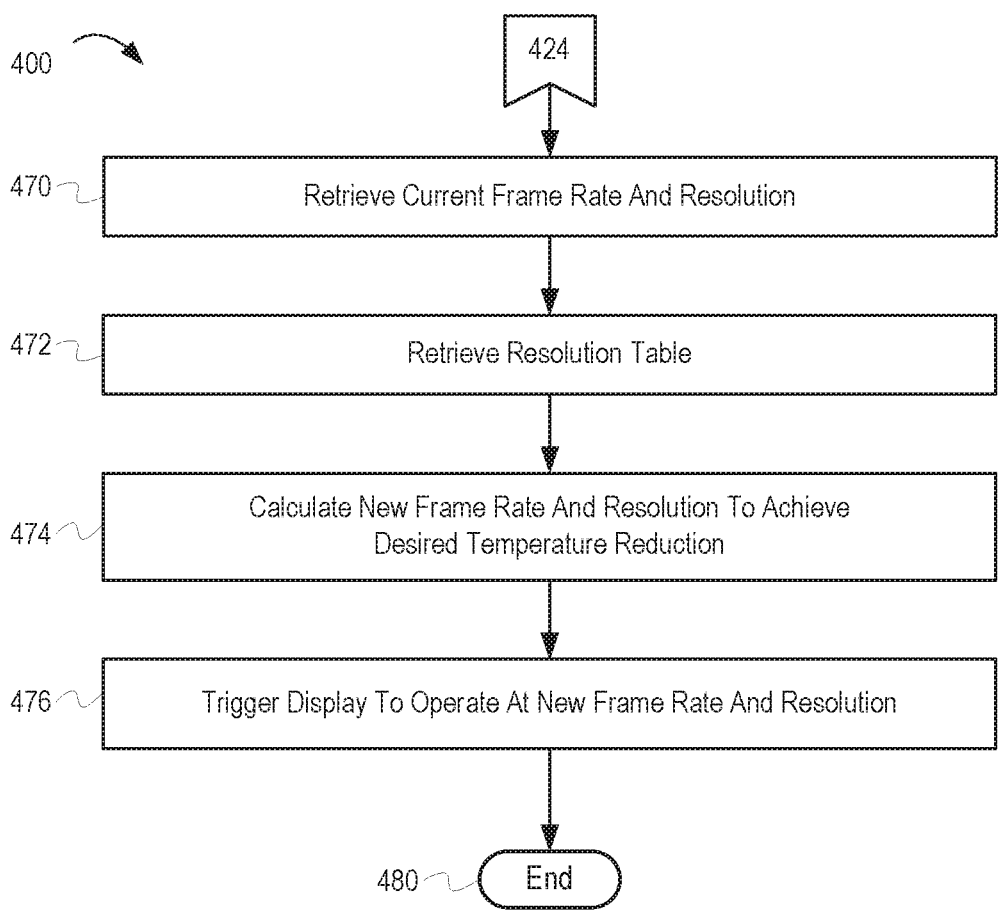

FIGS. 4A-C depicts a method 400 for managing display brightness of a mobile device, according to one or more embodiments. The description of method 400 will be described with reference to the components and examples of FIGS. 1-3. The operations depicted in FIGS. 4A-C can be performed by mobile device 100 or any suitable device, including one or more components of mobile device 100. For example, one or more of the processes of the methods described in FIGS. 4A-C may be performed by a processor (e.g., processor 102) executing program code associated with display brightness module 136.

With specific reference to FIG. 4A, method 400 begins at the start block 402. At block 404, processor 102 receives temperature sensor data 212 from temperature sensors 160. Temperature sensor data 212 contains temperature values for several locations within mobile device 100. Processor 102 retrieves surface temperature thresholds 216 (block 406). Processor 102 calculates surface temperatures 214 of mobile device 100 based on temperature sensor data 212 (block 408). At decision block 410, processor 102 determines if any of the calculated surface temperatures 214 are greater than their respective surface temperature thresholds 216. In response to determining that none of the calculated surface temperatures 214 are greater than their respective surface temperature thresholds 216, method 400 terminates at end block 412.

In response to determining that one or more of the calculated surface temperatures 214 are greater than their respective surface temperature threshold 216, processor 102 receives an ambient light level 250 from image capture device 132 (block 414). Processor 102 receives a current display light level 252 from display 130 (block 416). Processor 102 calculates a minimum display light level 254 based on the ambient light level 250 and the current display light level 252 (block 418). Minimum display light level 254 is the minimum light level that display 130 can be operated at without making the display non-viewable by a viewer. Display 130 has to have a minimum light level above the ambient light level in order to be visible to a viewer. At decision block 424, processor 102 determines if the current display light level 252 is less than the minimum display light level 254. In response to determining that the current display light level 252 is less than the minimum display light level 254, method 400 continues at block 470 of FIG. 4C.

With reference to FIG. 4B, in response to determining that the current display light level 252 is not less than (i.e., is greater than or equal to) the minimum display light level 254, processor 102 retrieves video data 220 from system memory 120 (block 430). In one embodiment, video data 220 can include data for video frames 222 and 240-246 that are to be shown on display 130 in an upcoming future time period. For example, video data 220 can include data for video frames that are to be displayed in the next 30 seconds on display 130. Processor 102 calculates an average frame light level 228 for each of the respective video frames (block 432).

Processor 102 calculates a change or difference between the average frame light level 228 for the respective video frames 222 and 240-246 (block 434). The change in light level can include a transition in light level from one video frame to another video frame. In one embodiment, the change in light level can be between consecutive video frames. In another embodiment, the change in light level can be calculated between a pre-determined number of video frames in a time period. For example, if the frame rate is 30 frames per second and the time period is 0.33 seconds, the change in light level would be calculated between 10 video frames. Processor 102 retrieves video frame light level change threshold 256 from system memory 120 (block 436).

At decision block 438, processor 102 determines if the video frames have a calculated change in light level that is greater than video frame light level change threshold 256. In response to determining that the video frames have a calculated change in light level that is greater than the video frame light level change threshold 256, processor 102 identifies the specific video frame and associated timestamp for which the light level is to be reduced (block 440). Processor 102 calculates a reduced display light level value 258 for the identified video frame based on the temperature sensor data 212 and video data 220 (block 442).

Processor 102 triggers display 130 to reduce the light level associated with the identified video frame to the reduced display light level value 258 (block 444). According to one aspect, based on empirical measurements, the display 130 of some handheld mobile devices can consume approximately 1.8 watts of power at maximum brightness, which is approximately 30 percent of the total power consumed by a mobile device. Thus, a reduction in brightness of display 130 can lower the overall temperature of mobile device 100. Processor 102 stores the reduced display light level value 258 to system memory 120 for use with future video frames being displayed (block 446). Method 400 ends at end block 460.

In one embodiment, processor 102 can check the length of the video being displayed and calculate a safe light level (i.e., reduced display light level value 258) for the temperature of mobile device 100 to be within surface temperature thresholds 216 and then set this light level for the entire length of the video being displayed. For example, if the video being displayed is a movie, processor 102 can calculate a reduced display light level value 258 and trigger display 130 to operate at the reduced display light level value 258 for the remainder of the movie.

In response to determining that the video frames do not have a calculated change in light level that is greater than the video frame light level change threshold 256, processor 102 calculates a time period 260 to gradually reduce the light level over several video frames (i.e., video frames 222 and 240-246 or later video frames) (block 450). Processor 102 calculates reduced display light level values 262 for the video frames in time period 262 based on the temperature sensor data 212 and video data 220 (block 452). The reduced display light level values 262 are calculated such that the decrements in light levels over several video frames are lower than a just noticeable difference. The decrements in light levels can occur over several non-sequential video frames. In an embodiment, the changes in light level do not have to be in sequential video frames. For example, if time period 260 contains 80 video frames, the light level could be decremented after every 20 video frames (i.e., at the 20th, 40th, 60th and 80th video frames). In one embodiment, the reduced display light level values 262 can be calculated for the last video frame in time period 260 and the light level slowly reduced to the light level of the last video frame in time period 260. Processor 102 triggers display 130 to gradually reduce the light level associated with time period 260 to the reduced display light level values 262 (block 454). Processor 102 stores the reduced display light level values 262 to system memory 120 for use with future video frames being displayed (block 456). Method 400 then terminates at end block 460.

Referring to FIG. 4C, in response to determining that the current display light level 252 is less than the minimum display light level 254, processor 102 retrieves current frame rate and resolution 270 from system memory 120 (block 470). Processor 102 retrieves resolution table 274 from system memory 120 (block 472). Processor 102 calculates a new frame rate and resolution 272 based on the current frame rate and resolution 270, temperature sensor data 212, video data 220 and resolution table 274 (block 474). Processor 102 calculates the new frame rate and resolution 272 to at least partially achieve a desired reduction in the operating temperature of mobile device 100. In one embodiment, the frame rate can be changed first. If the change in frame rate is insufficient to lower the temperature of the mobile device, then the resolution can be changed based on resolution table 274. Processor 102 triggers display 130 to operate at the new frame rate and resolution 272 (block 476). Method 400 then terminates at end block 480.

The present disclosure improves the viewing experience of the user of mobile device 100. When a change in brightness level to reduce the temperature of display 130 is required, the brightness reduction is implemented at the same time a change in brightness level above a threshold level of the video being displayed occurs. When the display is very bright, the light level can be reduced by larger values than when the display is dim. However, if the video being presented is static (i.e., not changing) such a reduction in brightness can be noticed by a user. If the change in brightness occurs at point in a video where a large change is occurring in the brightness level, the change in brightness is not noticeable to a viewer and the user experience is enhanced.

When there is a change in brightness level within a scene being displayed, the brightness level of display 130 can be reduced at the time when the change in brightness occurs in order to hide or mask the reduction in display brightness required due to overheating. For example, in a video game where there is explosion or, in a movie where the scene shifts from a bright to a dark scene, the brightness reduction due to temperature constraints can occur during or after the explosion in the video game and during or after the dark room scene in the movie in order to make the change in brightness less apparent to a viewer of display 130.

In the above-described method of FIGS. 4A-C, one or more of the method processes may be embodied in a computer readable device containing computer readable code such that operations are performed when the computer readable code is executed on a computing device. In some implementations, certain operations of the methods may be combined, performed simultaneously, in a different order, or omitted, without deviating from the scope of the disclosure. Further, additional operations may be performed, including operations described in other methods. Thus, while the method operations are described and illustrated in a particular sequence, use of a specific sequence or operations is not meant to imply any limitations on the disclosure. Changes may be made with regards to the sequence of operations without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general-purpose computer, special-purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

As used herein, the term "or" is inclusive unless otherwise explicitly noted. Thus, the phrase "at least one of A, B, or C" is satisfied by any element from the set {A, B, C} or any combination thereof, including multiples of any element.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

What is claimed is:

1. A method comprising:
   detecting, via a temperature sensor, a first temperature value of a mobile device;
   determining, by a processor, if the first temperature value is greater than a threshold temperature value;
   in response to determining that the first temperature value is greater than the threshold temperature value, retrieving video data for a plurality of video frames;
   determining if the video data contains a transition from a first video frame to a second video frame, the transition including a change in light level that is greater than a first light level threshold; and
   in response to determining that the video data contains the change in light level that is greater than the first light level threshold, triggering the display to reduce a first light level associated with the second video frame to a second light level when the second video frame is displayed.

2. The method of claim 1, further comprising:
   calculating a first average light level for the first video frame and a second average light level for the second video frame; and
   calculating the change in light level as a difference between the first average light level and the second average light level.

3. The method of claim 1, further comprising:
   calculating the second light level of the second video frame based on the first temperature value and the first light level of the second video frame, the calculated second light level being lower than the first light level.

4. The method of claim 3, further comprising:
   in response to determining that the video data contains a change in light level that is less than the first light level threshold, calculating a first time period to reduce the first light level; and triggering the display to reduce the first light level to the calculated second light level over the first time period to facilitate a gradual transition of light levels from the first video frame to a third video frame.

5. The method of claim 1, further comprising:
identifying a start time associated with the second video frame; and
wherein triggering the display to reduce the first light level to the second light level is performed at the start time associated with the second video frame.

6. The method of claim 1, further comprising:
receiving a first ambient light level value from an image capture device; and
calculating a minimum display light level value for the first video frame based on the first ambient light level value.

7. The method of claim 6, further comprising:
receiving a first display light level value;
determining if the first display light level value is less than the minimum display light level value; and
in response to determining that the first display light level value is less than the minimum display light level value:
retrieving a current frame rate and resolution associated with the video data;
calculating a new reduced frame rate and resolution for the video data based on the first temperature value and the minimum display light level value; and
triggering the display to operate at the new reduced frame rate and resolution.

8. A mobile device comprising:
a memory having stored thereon a display brightness module for determining a brightness of the mobile device;
at least one temperature sensor that detects a first temperature value associated with the mobile device;
a display; and
one or more processors communicatively coupled to the memory, the display, and the at least one temperature sensor, the one or more processors executing program code of the display brightness module, which enables the mobile device to:
receive the first temperature value from the at least one temperature sensor;
determine if the first temperature value is greater than a threshold temperature value;
in response to determining that the first temperature value is greater than the threshold temperature value, retrieve video data for a plurality of video frames;
determine if the video data contains a transition from a first video frame to a second video frame, the transition including a change in light level that is greater than a first light level threshold; and
in response to determining that the video data contains the change in light level that is greater than the first light level threshold, trigger the display to reduce a first light level associated with the second video frame to a second light level when the second video frame is displayed.

9. The mobile device of claim 8, wherein the processor is further enabled to:
calculate a first average light level for the first video frame and a second average light level for the second video frame; and
calculate the change in light level as a difference between the first average light level and the second average light level.

10. The mobile device of claim 8, wherein the processor is further enabled to:
calculate the second light level of the second video frame based on the first temperature value and the first light level of the second video frame, the calculated second light level being lower than the first light level.

11. The mobile device of claim 10, wherein the processor is further enabled to:
in response to determining that the video data contains a change in light level that is less than the first light level threshold, calculate a first time period to reduce the first light level; and
trigger the display to reduce the first light level to the calculated second light level over the first time period to facilitate a gradual transition of light levels from the first video frame to a third video frame.

12. The mobile device of claim 8, wherein the processor is further enabled to:
identify a start time associated with the second video frame; and
wherein triggering the display to reduce the first light level to the second light level is performed at the start time associated with the second video frame.

13. The mobile device of claim 8, wherein the processor is further enabled to:
receive a first ambient light level value from an image capture device; and
calculate a minimum display light level value for the first video frame based on the first ambient light level value.

14. The mobile device of claim 13, wherein the processor is further enabled to:
receive a first display light level value;
determine if the first display light level value is less than the minimum display light level value; and
in response to determining that the first display light level value is less than the minimum display light level value:
retrieve a current frame rate and resolution associated with the video data;
calculate a new reduced frame rate and resolution for the video data based on the first temperature value and the minimum display light level value; and
trigger the display to operate at the new reduced frame rate and resolution.

15. A computer program product comprising:
a computer readable storage device with program code stored thereon which, when executed by one or more processors of a mobile device having at least one temperature sensor, a display, and a memory, enables the mobile device to complete the functionality of:
receiving a first temperature value from the at least one temperature sensor;
determining if the first temperature value is greater than a threshold temperature value;
in response to determining that the first temperature value is greater than the threshold temperature value, retrieving video data for a plurality of video frames;
determining if the video data contains a transition from a first video frame to a second video frame, the transition including a change in light level that is greater than a first light level threshold; and
in response to determining that the video data contains the change in light level that is greater than the first light level threshold, triggering the display to reduce a first light level associated with the second video frame to a second light level when the second video frame is displayed.

16. The computer program product of claim 15, wherein the program code for managing display brightness comprises program code that further enables the mobile device to complete the functionality of:

calculating a first average light level for the first video frame and a second average light level for the second video frame; and calculating the change in light level as a difference between the first average light level and the second average light level.

17. The computer program product of claim 15, wherein the program code for managing display brightness comprises program code that further enables the mobile device to complete the functionality of:

calculating the second light level of the second video frame based on the first temperature value and the first light level of the second video frame, the calculated second light level being lower than the first light level.

18. The computer program product of claim 17, wherein the program code for managing display brightness comprises program code that further enables the mobile device to complete the functionality of:

in response to determining that the video data contains a change in light level that is less than the first light level threshold, calculating a first time period to reduce the first light level; and triggering the display to reduce the first light level to the calculated second light level over the first time period to facilitate a gradual transition of light levels from the first video frame to a third video frame.

19. The computer program product of claim 15, wherein the program code for managing display brightness comprises program code that further enables the mobile device to complete the functionality of:

identifying a start time associated with the second video frame; and wherein triggering the display to reduce the first light level to the second light level is performed at the start time associated with the second video frame.

20. The computer program product of claim 15, wherein the program code for managing display brightness comprises program code that further enables the mobile device to complete the functionality of:

receiving a first ambient light level value from an image capture device; and calculating a minimum display light level value for the first video frame based on the first ambient light level value.

\* \* \* \* \*